(12) United States Patent
Yoerg et al.

(10) Patent No.: US 6,338,405 B1
(45) Date of Patent: Jan. 15, 2002

(54) DEVICE FOR ENCASING STORAGE MEDIA CONTAINING SEPARATELY ADDRESSABLE DATA

(75) Inventors: Robert Yoerg, 11199 Marquesste St., Spring Hill, FL (US) 34609; Steven Edmonds, Hudson, FL (US)

(73) Assignee: Robert Yoerg, Spring Hill, FL (US)

(*) Notice: Subject to any disclaimer, the term of this patent is extended or adjusted under 35 U.S.C. 154(b) by 0 days.

(21) Appl. No.: 09/596,427

(22) Filed: Jun. 16, 2000

(51) Int. Cl.[7] .............................................. B65D 85/57
(52) U.S. Cl. .................... 206/308.1; 206/232; 369/75.1
(58) Field of Search .............................. 206/232, 308.1, 206/309, 312, 387.1; 369/75.1, 77.2

(56) References Cited

U.S. PATENT DOCUMENTS

| | | | |
|---|---|---|---|
| 3,000,640 A | | 9/1961 | Strauss |
| 4,138,703 A | * | 2/1979 | Stave et al. ................ 206/309 |
| 4,290,524 A | * | 9/1981 | Azar .......................... 206/232 |
| 4,519,500 A | * | 5/1985 | Perchak ..................... 206/312 |
| 4,566,590 A | * | 1/1986 | Manning et al. ............ 206/232 |
| 4,793,477 A | * | 12/1988 | Manning et al. ............ 206/232 |
| 4,849,958 A | | 7/1989 | Douwes |
| 4,872,151 A | | 10/1989 | Smith |
| 4,989,197 A | | 1/1991 | Bessho |
| 5,119,353 A | | 6/1992 | Asakura |
| 5,207,717 A | * | 5/1993 | Manning .................... 206/232 |
| 5,299,185 A | | 3/1994 | Sakurai |
| 5,548,571 A | | 8/1996 | Mistretta |
| 6,229,779 B1 | * | 5/2001 | Berry et al. ................ 369/75.1 |

FOREIGN PATENT DOCUMENTS

JP 5-32267 A * 9/1993 .............. 206/308.1

* cited by examiner

Primary Examiner—Bryon P. Gehman
(74) Attorney, Agent, or Firm—Dennis G. LaPointe Mason & Associates, PA

(57) ABSTRACT

A protective case for storage media that itself has separately addressable data independent of the storage media encased in the protective case. The inventive features allows for the storing, playing and recording of predetermined data. A display on its exterior for displaying stored data is provided and it is able to communicate with other devices for the access, reproduction and alteration of the data.

31 Claims, 4 Drawing Sheets

DEVICE FOR ENCASING STORAGE MEDIA CONTAINING SEPARATELY ADDRESSABLE DATA

BACKGROUND OF THE INVENTION

1. Field of the Invention

The present invention relates to a device for encasing storage media wherein the protective case contains separately addressable data.

2. Description of Related Art

Protective cases for storage media are commonplace. Numerous diverse types of storage media, such as Compact Disc ("CD"), CD-Read Only Memory ("CD-ROM"), CD-Read/Write ("CD-R"), CD-Read/Write/Re-Write ("CD-RW"), Digital Video Disc ("DVD"), Eight-Millimeter Movie Film, Video Cassette Tape and Video Game Cartridge are employed. Storage media can be easily scratched or damaged, so therefore are often sold and stored in protective cases.

Related art includes U.S. Pat. No. 5,119,353 to Asakura which discloses an integrated circuit chip or memory device imbedded into the central region of a CD. In U.S. Pat. No. 4,872,151 to Smith, additional data is written onto and read from the reverse side of a CD. The data described may be identification codes or possibly samples of data stored on the obverse side. U.S. Pat. No. 3,000,640 to Strauss discloses a small sample record frangibly integral with the storage case which is intended to be separated from the storage case. The Strauss invention teaches a device which must be broken from the storage case before the data on it can be read. U.S. Pat. No. 5,548,571 to Mistretta discloses a CD case which provides identification data on a storage disc by means of holes at the edge of a case. The disc is read by the disc drive while the disc is in the case.

None of the related art provide for the reproduction of data stored in the protective case.

It would be advantageous to be able to hear a message regarding the content of a CD or play a sample of music recorded on a certain CD without having to open the protective case. Similarly, it would be advantageous for a protective case to display data about a CD, such as which track is currently being played audibly from the protective case, or who the artist is. Furthermore, it would be advantageous to be able to communicate that displayed data with a computer, so it may easily be altered or read, or with a stereo amplifier, so an audio message may be amplified. Also, it would be advantageous for a protective case without a CD in it to be able to indicate audibly and/or visually which CD is to go into it.

SUMMARY OF THE INVENTION

The present invention contemplates a device where information may be obtained about the content of the storage media that is contained within a protective case so that the protective case is not opened unnecessarily. In particular, the present invention relates to a method and device for encasing storage media and which contains means for reproducing and/or recording messages regarding the storage media. The present invention includes the following interrelated objects, aspects and features:

In one embodiment, the invention comprises a protective case suitable for encasing storage media, such protective case being adaptable for placing into and retrieving such storage media; first means cooperatively attached to the protective case for storing data, such data being separate and apart from the data stored on the storage media; and second means cooperatively attached to the protective case for reproducing the separately stored data.

In another embodiment, the first means and the second means are attached to the interior of the protective case.

In still another embodiment, the first means is attached to the interior of the protective case and the second means is attached to the exterior of the protective case.

In yet another embodiment, the invention further comprises third means cooperatively attached to the protective case for activating the second means.

In still another embodiment, the third means is attached to the interior of the protective case.

In still another embodiment, the third means is attached to the exterior of the protective case.

In yet another embodiment, the invention further comprises fourth means cooperatively attached to the protective case for activating the first means.

In still another embodiment, the fourth means is attached to the interior of the protective case.

In still another embodiment, the fourth means is attached to the exterior of the protective case.

In still another embodiment, the invention comprises a fifth means cooperatively attached to the protective case for indicating the operation of the third means.

In still another embodiment, the fifth means is attached to the interior of the protective case.

In still another embodiment, the fifth means is attached to the exterior of the protective case.

In still another embodiment, the invention comprises a sixth means cooperatively attached to the protective case for indicating the operation of the fourth means.

In still another embodiment, the sixth means is attached to the interior of the protective case.

In still another embodiment, the sixth means is attached to the exterior of the protective case.

In yet still another embodiment, the invention further comprises seventh means cooperatively attached to the protective case for communicating the separately stored data between the protective case and remote device(s) (not shown), distant from the protective case.

In still another embodiment, the seventh means is attached to the interior of the protective case.

In still another embodiment, the seventh means is attached to the exterior of the protective case.

In yet another embodiment, the invention further comprises eighth means cooperatively attached to the protective case for displaying data stored in the first means.

In still another embodiment, the eighth means is attached to the interior of the protective case.

In still another embodiment, the eighth means is attached to the exterior of the protective case.

In yet another embodiment, the invention further comprises ninth means cooperatively attached to the protective case for storing additional data, such additional data may be displayed by the eighth means.

In still another embodiment, the ninth means is attached to the interior of the protective case.

In still another embodiment, the ninth means is attached to the exterior of the protective case.

In yet another embodiment, the invention further comprises a tenth means cooperatively attached to the protective case for communicating data between the protective case and remote device(s) (not shown), distant from the protective case, separate from the seventh means.

In still another embodiment, the tenth means is attached to the interior of the protective case.

In still another embodiment, the tenth means is attached to the exterior of the protective case.

In yet still another embodiment, the invention comprises a data storage assembly, comprising a protective case suitable for encasing storage media, such storage media comprising of component(s) from the list of: CD, CD-ROM, CD-R, CD-RW, DVD, Eight-Millimeter Movie Film, Video Cassette Tape, Video Came Cartridge and combinations thereof, such protective case being adaptable for placing into and retrieving such storage media; first means cooperatively attached to the protective case for storing data, such data being separate and apart from the data stored on the storage media, such data may be stored in a single block, and may alternatively be stored in distinct addressable segments, wherein the first means cooperatively attached to the protective case for storing data, comprising of component(s) from the list of: Data Record playback Module ("DRPM"), Central Processing Unit ("CPU"), Random Access Memory ("RAM"), Read Only Memory ("ROM"), Programmable Read Only Memory ("PROM"), Erasable Programmable Read Only Memory ("EEPROM"), Electronically Erasable Programmable Read Only Memory ("EEPROM") and combinations thereof, in communication with component(s) from the list of: condenser microphone, piezoelectric device and combinations thereof; second means cooperatively attached to the protective case for reproducing the separately stored data, comprising of component(s) from the list of: DRPM, CPU, RAM, ROM, PROM, EPROM and EEPROM and combinations thereof, in communication with component(s) from the list of: speaker, piezoelectric device and combinations thereof; third means cooperatively attached to the protective case for activating the second means, comprising of component(s) from the list of: contact switch, bubble switch, capacitance switch; fourth means cooperatively attached to the protective case for activating the first means, comprising of component(s) from the list of: contact switch, bubble switch, capacitance switch; a fifth means cooperatively attached to the protective case for indicating the operation of the third means, comprising of component(s) from the list of: Light Emitting Diode ("LED"), Liquid Crystal Display ("LCD"), incandescent bulb and combinations thereof; sixth means cooperatively attached to the protective case for indicating the operation of the fourth means, comprising of component(s) from the list of: LED display, LCD display, incandescent bulb and combinations thereof; seventh means cooperatively attached to the protective case for communicating the separately stored data between the protective case and one or more remote devices (not shown), distant from the protective case, comprising of component(s) from the list of: earphone jack, stereo jack, fiberoptic interface port, infrared transmitter and detector and combinations thereof; eighth means cooperatively attached to the protective case for displaying data stored in the first means, comprising of component(s) from the list of: LED display, LCD display, incandescent bulb and combinations thereof; ninth means cooperatively attached to the protective case for storing additional data, data for use in the eighth means may also be stored in the ninth means, comprising of component(s) from the list of: DRPM, CPU, RAM, ROM, PROM, EPROM, EEPROM and combinations thereof; tenth means cooperatively attached to the protective case for communicating data between the protective case and one or more remote devices (not shown), distant from the protective case, separate from the seventh means, comprising of component(s) from the list of: earphone jack, stereo jack, fiberoptic interface port, infrared transmitter and detector and combinations thereof.

These and other aspects and features of the present invention will be better understood from the following detailed description of the preferred embodiments when read in conjunction with the appended figures.

DETAILED DESCRIPTION OF THE INVENTION

Figure 1:
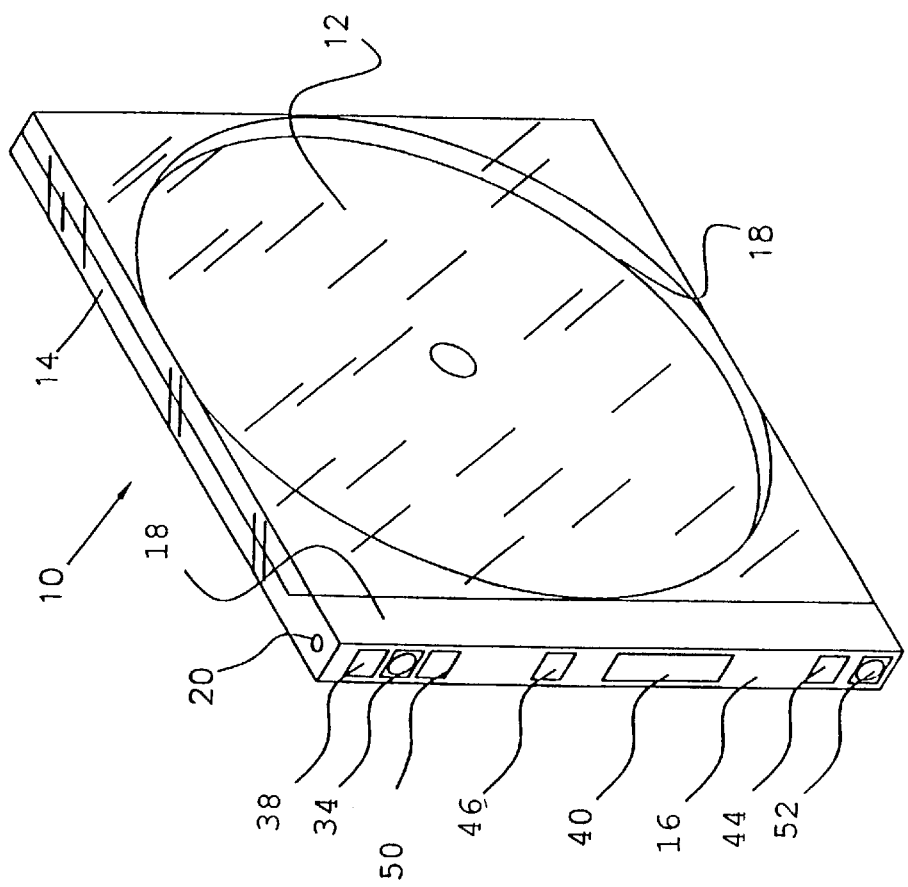
FIG. 1 is a view of an embodiment of the invention for a CD protective case, when closed.

Referring to FIGS. 1–4, a protective case for storage media (data storage assembly) in accordance with the teachings of the present invention is generally designated by the reference numeral 10. The protective case illustrated is a protective case for a Compact Disc ("CD"). However, the invention is equally applicable to protective cases for CD-Read Only Memory ("CD-ROM"), CD-Read/Write ("CD-R"), CD-Read/Write/Re-Write ("CD-RW"), Digital Video Disc ("DVD"), Eight-Millimeter Movie film, Video Cassette Tape, Video Game Cartridge, and other storage media.

It is instructive to know the structure of the protective case 10 in describing the invention. In FIG. 1, the protective case 10 is represented in the embodiment of a CD protective case. The protective case 10 comprises three parts: the front cover 12, the back cover 14 with a binding wall 16, and the insert section 18 for the back cover 14, and is shown in greater detail in FIG. 2. The back cover 14 and the front cover 12, are attached by protrusions 20 facing inward from the front cover 12, which fit into corresponding holes 22 on the back cover 14.

Figure 2:
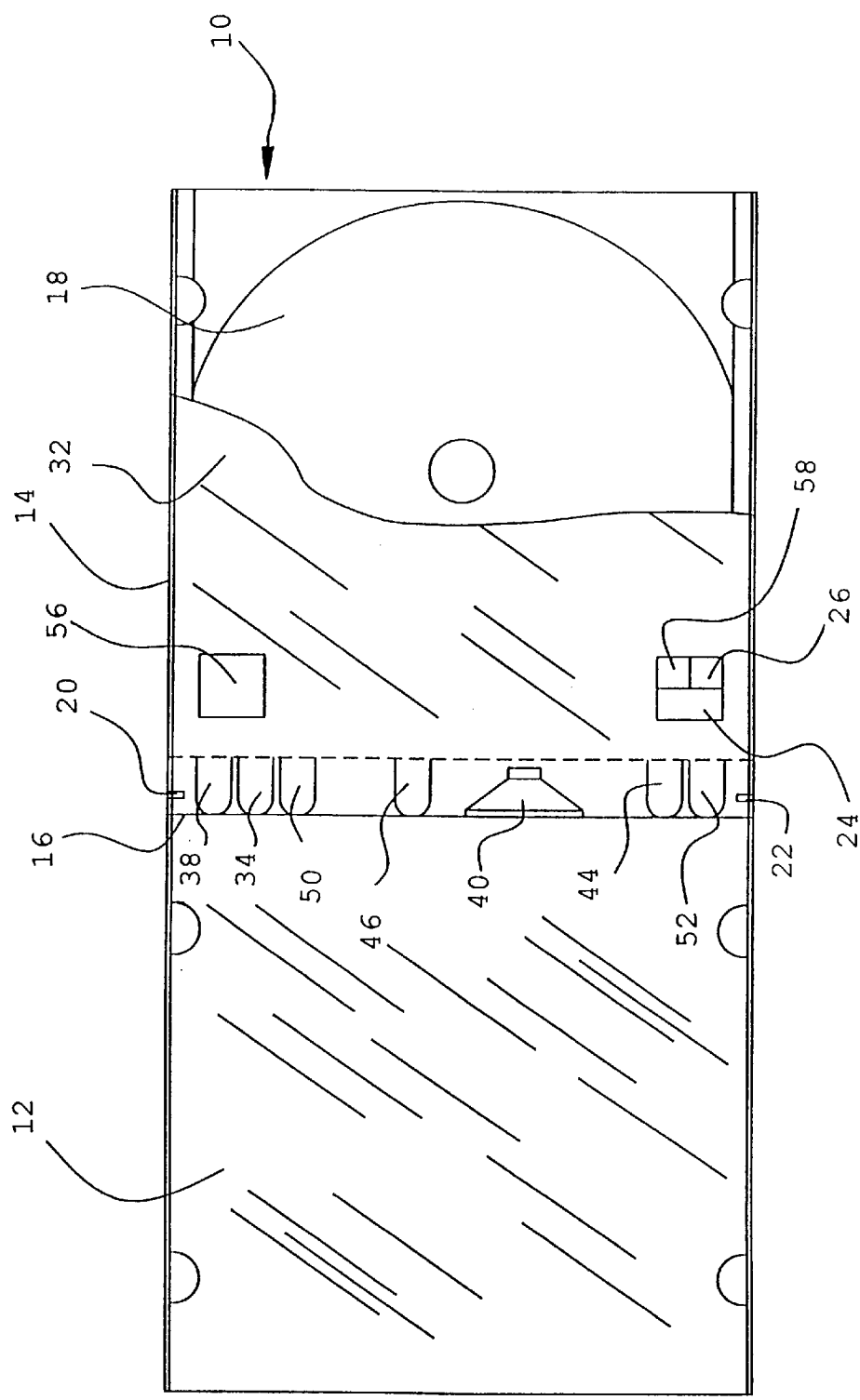
FIG. 2 is a view of an embodiment of the invention for a CD protective case, when open.

FIG. 2 also illustrates one available area where a first means 24 for storing data and a second means 26 for reproducing the separately stored data, may cooperatively attach to the protective case 10. In using the term "data," this description specifically refers to information stored in the protective case 10 about the enclosed storage media, and does not refer to data stored on the storage media. The data may be audible in nature, although electronic, graphic, video and other types of data know in the art are also contemplated. The first means 24 may comprise, as illustrated in one embodiment in FIG. 3, one or more Data Record and Playback Module ("DRPM") 28, Central Processing Unit ("CPU") 30, or similar devices. Also, the second means 26 may comprise one or more DRPM 28, CPU 30, or similar devices. In FIG. 2, the first means 24 and the second means 26 are two separate elements. However, a single DRPM 28, CPU 30, or similar devices may provide the first means 24 and the second moans 26 in a single element. In addition to other forms of data, the data may include sound which is audible when reproduced, or which is beyond the range of human hearing. Data stored in the first means 24 may be volatile or non-volatile, analog or digital. The first means 24 may have data pre-recorded on it. There are many known ways in the art for pre-storing data, such as the method CDs are currently pre-programmed with music. Furthermore, data may be recorded, stored and reproduced in distinct addressable segments within a DRPM 28, CPU 30 or similar device(s) which is separate and distinct from that stored on the storage media itself.

As shown in FIG. 2, the first means 24 and the second means 26 are in cooperative attachment to the interior of the protective case 10 in an area 32 between the back cover 14 and the insert section 18; however, other embodiments are possible, such as where the first means 24 is on the interior of the protective case 10, and the second means 26 is cooperatively attached to the exterior of the protective case 10. If the data stored in the first means 24 is in distinct addressable segments, then a track selection button 34, shown in FIGS. 1–2, may also be used to select a particular segment of the stored data. The track selection button 34 may also be a contact switch, bubble switch, capacitance switch, or a similar device.

In another embodiment, the protective case 10 includes a third means 36 for activating the second means 26. The third means 36 may be comprised of a play button 38, as shown in FIGS. 1–2, for activating the second means 26 and one or more speakers 40, shown in FIGS. 1–2, on the binding wall 16 of protective case 10. The play button 38 may be a contact switch, bubble switch, capacitance switch, or a similar device.

In yet another embodiment, the protective case 10 includes a fourth means 42 for activating the first means 24. The fourth means 42 may be comprised of a record button 44, as shown in FIGS. 1–2, for activating the first means 24 and one or more microphones 46, such as a condenser microphone, a piezoelectric device, or a similar device and combinations thereof. The record button 44 may be a contact switch, bubble switch, capacitance switch, or a similar device.

Figure 3:
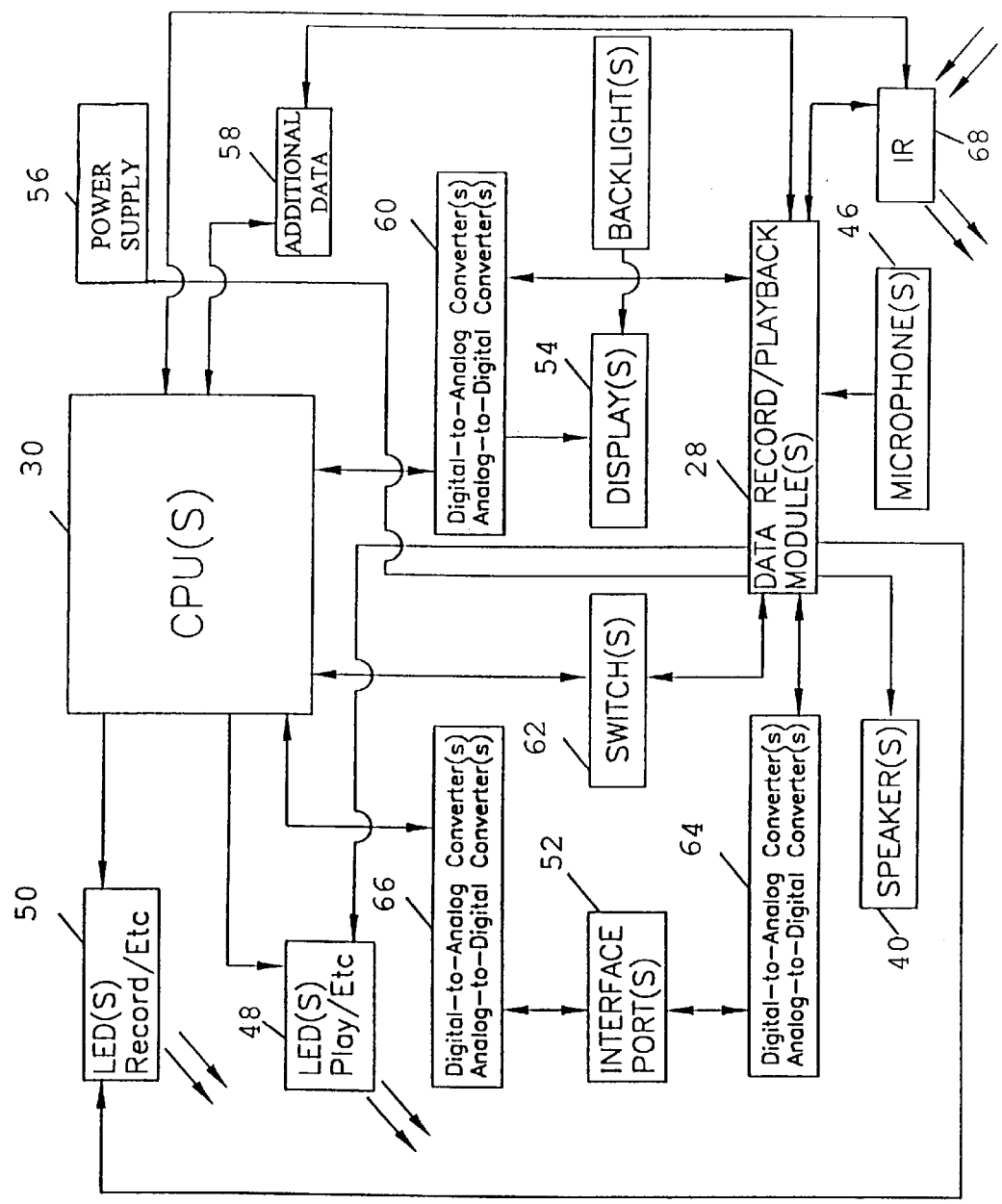
FIG. 3 is a diagram of the interrelation of the components in an embodiment of the invention pertaining to the storage and reproduction of reproducible data.

Also contemplated by the invention is a fifth means 48 for indicating the operation of the third means 36, shown in FIG. 3. The fifth means 48 may comprise a Light Emitting Diode ("LED") display, a Liquid Crystal Diode ("LCD") display, incandescent bulb, or similar devices and combinations thereof. Furthermore, one or more backlights for LCD display are also contemplated to be used with the fifth means 48. Alternatively, activation of the play button 38 may activate the fifth means 48 for indicating the operation of the third means 36.

Also contemplated by the invention is a sixth means 50, shown in FIGS. 1–4, for indicating the operation of the fourth means 42. The sixth means 50 may comprise a Light Emitting Diode ("LED") display, a Liquid Crystal Diode ("LCD") display, incandescent bulb, or similar devices and combinations thereof. Furthermore, one or more backlights for LCD display are also contemplated to be used with the sixth means 50. Alternatively, activation of the record button 44 may activate the sixth means 50 for indicating the operation of the fourth means 42.

In yet another embodiment, the invention comprises a seventh means 52 for communicating the separately stored data between the protective case 10 and one or more remote devices (not shown), distant from the protective case 10. The seventh means 52 may be a fiberoptic interface port, infrared transmitter and detector, or similar devices and combinations thereof. For audibly reproduced data, the seventh means 52 may be an earphone jack, stereo jack, or similar devices and combinations thereof.

Furthermore, according to the invention an eighth means 54 for displaying data is contemplated in this invention. The display may be a LED, LCD, incandescent bulb, or similar devices and combinations thereof. Also, a backlight may be utilized with the eighth means 54. The eighth means 54 may utilize the same display as the fifth means 48, and/or sixth means 50, or may have its own display, shown in FIG. 3. FIG. 2 also illustrates a power supply 56, although a power supply, that is attached to the protective case 10 is not necessary. The power supply 56 may be one or more batteries, although alternatives are contemplated.

Also, ninth means 58 for storing additional data may be added to the invention. The ninth means 58 for storing additional data may be used to store additional separately stored data, or may be used to store data for the operation of the invention, shown in FIGS. 2–3.

Figure 4:
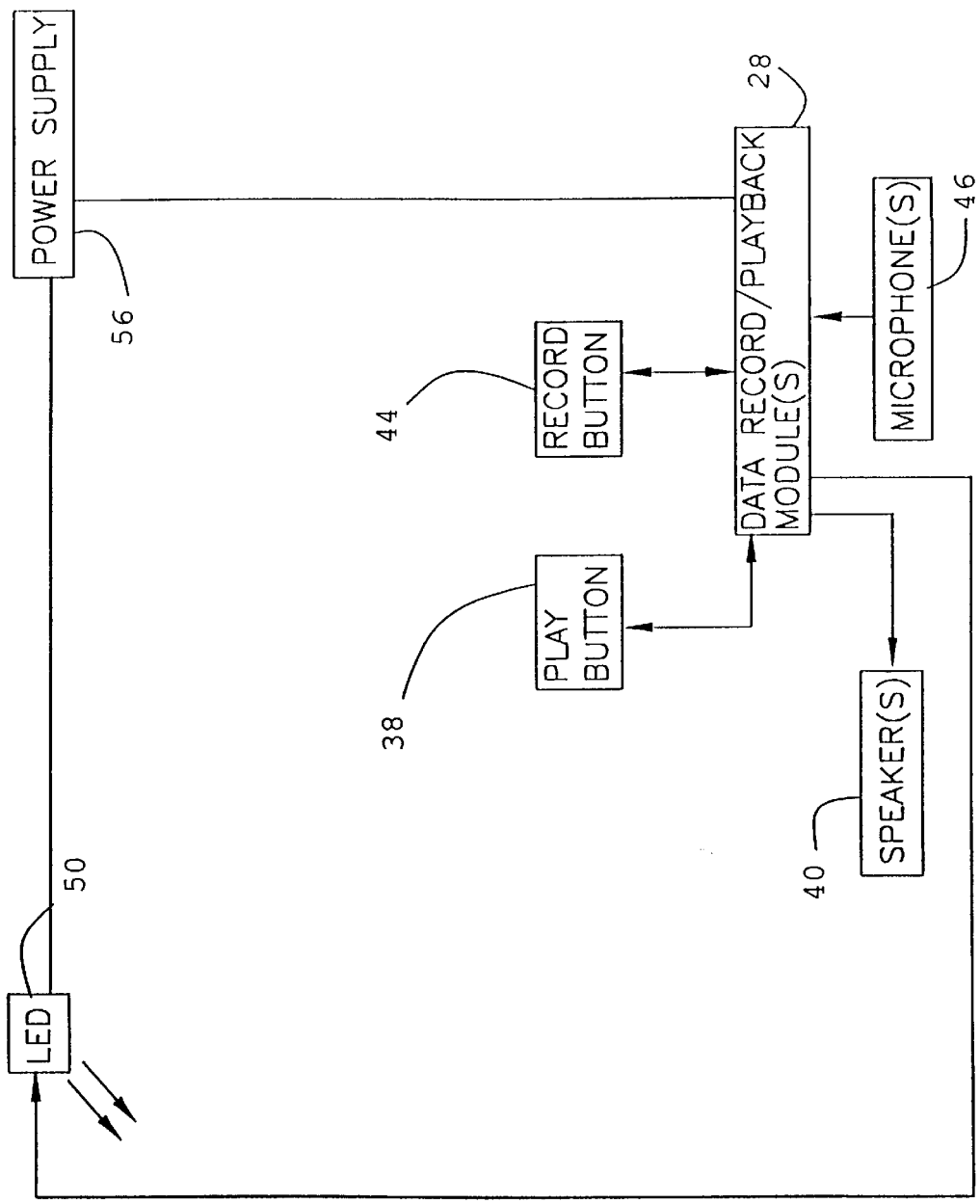
FIG. 4 is a diagram of the interrelation of the components in another embodiment of the invention pertaining to the storage and reproduction of audibly reproducible data.

An embodiment providing for the storing and reproduction of separately stored audibly reproducible data is diagrammed in FIG. 4. A power supply 56, is connected to a single DRPM 28, embodying the first means 24 and the second means 26. As shown, the user activates the play button 38 to reproduce data via the second means 26. The power supply 56, is also connected to the sixth means 50. However, other means for supplying power to the protective case 10 are also contemplated. Upon activation of the play button 38, the DRPM 28 reproduces the audible data stored within it through one or more speaker(s) 40.

FIG. 4 also depicts activation and use of the fourth means 42. A user activates the record button 44 and speaks into one or more microphones 46. For example, the record button 44 may be a contact switch. The user of the record button 44 may also activate the sixth means 50. When the user has finished recording, the user may release the contact, ending the active status of the fourth means 42.

Another embodiment is illustrated in FIG. 3, wherein the power supply 56 is connected to the DRPM 28. However, other methods for supplying power to the protective case 10 are known. Furthermore, the first means 24 and the second means 26 comprises a single DRPM 28 in communication with a single CPU 30. More communication with additional DRPMs and CPUs are also contemplated for storing additional data. Moreover, the DRPM 28 and the CPU 30 may be interchangeable. One or more converter(s) 60 for transforming analog data to digital data, or digital data to analog data is shown between the DRPM 28 and the CPU 30. However, the converter(s) 60 is not necessary if the DRPM 28 and the CPU 30 communicate data in the same form.

Also shown, the DRPM 28 communicates with one or more speakers 40, for audibly reproducing the data. The third means 36 and the fourth means 42 may be manipulated by one or more switches 62, which include the play button 38 and the record button 44. One or more switches 62 also provide means for accessing any other data on the DRPM 28 and the CPU 30, such as track selection or access to the past, present and future status of the data as it is played. The DRPM 28 is also shown to communicate with microphone (s) 46 for recording data directly into the DRPM 28. In addition, the DRPM 28 and the CPU 30 are shown in communication with a sixth means 50 for indicating whether the device is recording data, such as an LED display, LCD display, incandescent bulb, or similar devices and combinations thereof. The sixth means 50 may also use a backlight.

Moreover, FIG. 3 illustrates a seventh means 52 for communicating the separately stored data between the protective case 10 and one or more remote devices (not shown), distant from the protective case 10, or from one or more remote devices (not shown) to the protective case 10. Communication with a distant device may be for the access, reproduction and/or alteration of the data. The seventh means 52 may be an interface port such as in earphone jack, stereo jack, or fiberoptic interface port, infrared detector and transmitter, or similar devices and combinations thereof. The remote device(s) may be another protective case, a stereo amplifier, computer, or similar devices and combinations thereof. The seventh means 52 utilizes converters 64 and 66 communicating with the DRPM 28 and the seventh means 52, and with the CPU 30 and the seventh means 52, to transform the data into the form desired, either analog or digital.

FIG. 3 also illustrates an embodiment with communication from the DRPM 28 and the CPU 30 through one or more converters 60 to an eighth means 54 for displaying data. The data may be alpha-numeric and may also comprise other symbols or graphics. The eighth means 54 may be used to display information about the data stored in the storage media, or the operational status of the protective case 10. However, other information may also be displayed. As shown in FIG. 3, the fifth means 48, the sixth means 50, and the eighth means 54 are separate elements. However, they may alternatively use the same LED display, LCD display, incandescent bulb, or similar device(s), and use the same backlight and combinations thereof. The eighth means 54 may also indicate which distinct addressable segment of data is currently being reproduced by the second means 26. The converter(s) 60 is not necessary if the data in the DRPM 28 and the CPU 30 is in a form that the eighth means 54 can readily use.

Also shown in FIG. 3, a ninth means 58 for storing additional data between the DRPM 28 and the CPU 30. This ninth means 58 may be placed elsewhere within the diagram as is known in the art. The ninth means 58 may be volatile or non-volatile, and may be analog or digital. The additional data may be stored in one or more of the following: DRPM, CPU, RAM, ROM, PROM, EPROM, EEPROM, or similar devices. Data for use in the eighth means 54 may also be stored in the ninth means 58.

Also shown in FIG. 3, a tenth means 68 for communicating data between the protective case 10 and remote devices (not shown), distant from the protective case 10, separate from the seventh means 52, is also contemplated. FIG. 3 illustrates that the protective case 10 may communicate both analog data and digital data simultaneously. FIG. 3 shows a tenth means 68 as comprising an infrared detector and transmitter, for communication of data to one or more remote devices (not shown), distant from the protective case 10. Other means are known, such as an earphone jack, stereo jack, or fiberoptic interface port or similar devices and combinations thereof. As shown, both the DRPM 28 and the CPU 30 communicate directly with the tenth means 68 without communicating through one or more converter(s), although one or more converter(s) may be used. The tenth means 68 may be for communication of data to or from a stereo amplifier, computer, or similar devices and combinations thereof.

An invention has been disclosed in terms of a preferred embodiment thereof which fulfills each and every one of the objects of the invention as set forth herein above and provides a new and useful device for encasing storage media containing separately addressable data of great novelty and utility.

The invention is clearly new and useful. Moreover, it was not obvious to those of ordinary skill in this art at the time it was made in view of the prior art considered as a whole required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall there between.

Now that the invention has been described,

What is claimed is:

1. A data storage assembly for storage media comprising:
   a protective case suitable for encasing storage media, said protective case being adaptable for the placement and retrieval of the storage media;
   a power supply;
   means cooperatively attached to the protective case and for storing data, said means being independent and separate and apart from the storage media encasable in the protective case; and
   means cooperatively attached to the protective case for playback of the separately stored data,
   wherein the stored data is one of a reproduced data, a recorded data, and a combination thereof regarding the storage media and said stored data being independent and separate and apart from data stored on the storage media, and
   wherein the stored data is storable in one of a single block and in distinct addressable segments.

2. The data storage assembly according to claim 1, wherein the means for storing data and the means for playback are attached to an interior of the protective case.

3. The data storage assembly according to claim 1, wherein the means for storing data is attached to an interior of the protective case and the means for playback is attached to an exterior of the protective case.

4. The data storage assembly according to claim 1, further comprising:
   means cooperatively attached to the protective case for activating the means for playback.

5. The data storage assembly according to claim 4, wherein the means for activating the means for playback is attached to an interior of the protective case.

6. The data storage assembly according to claim 4, wherein the means for activating the means for playback is attached to an exterior of the protective case.

7. The data storage assembly according to claim 4, further comprising:
   means cooperatively attached to the protective case for activating the means for storing data.

8. The data storage assembly according to claim 7, wherein the means for activating the means for storing data is attached to an interior of the protective case.

9. The data storage assembly according to claim 7, wherein the means for activating the means for storing data is attached to an exterior of the protective case.

10. The data storage assembly according to claim 7, further comprising:
    means cooperatively attached to the protective case for indicating an operation of the means for activating the means for storing data.

11. The data storage assembly according to claim 10, wherein the means for indicating the operation of the means for activating the means for storing data is attached to an interior of the protective case.

12. The data storage assembly according to claim 10, wherein the means for indicating the operation of the means for activating the means for storing data is attached to an exterior of the protective case.

13. The data storage assembly according to claim 7, further comprising:
    means cooperatively attached to the protective case for communicating the separately stored data between the protective case and at least one remote device.

14. The data storage assembly according to claim 13, wherein the means for communicating the separately stored data between the protective case and at least one remote device is attached to an interior of the protective case.

15. The data storage assembly according to claim 13, wherein the means for communicating the separately stored data between the protective case and at least one remote device is attached to an exterior of the protective case.

16. The data storage assembly according to claim 4, further comprising:
    means cooperatively attached to the protective case for indicating an operation of the means for activating the means for playback.

17. The data storage assembly according to claim 16, wherein the means for indicating the operation of the means for activating the means for playback is attached to an interior of the protective case.

18. The data storage assembly according to claim 16, wherein the means for indicating the operation of the means for activating the means for playback is attached to an exterior of the protective case.

19. The data storage assembly according to claim 4, further comprising:
    means cooperatively attached to the protective case for communicating the separately stored data between the protective case and at least one remote device.

20. The data storage assembly according to claim 19, wherein the means for communicating the separately stored data between the protective case and at least one remote device is attached to an interior of the protective case.

21. The data storage assembly according to claim 19, wherein the means for communicating the separately stored data between the protective case and at least one remote device is attached to an exterior of the protective case.

22. The data storage assembly according to claim 4, further comprising:
    means cooperatively attached to the protective case for displaying the separately stored data in the means for storing data.

23. The data storage assembly according to claim 22, wherein the means for displaying the data stored in the means for storing data is attached to an interior of the protective case.

24. The data storage assembly according to claim 22, wherein the means for displaying the data stored in the means for storing data is attached to an exterior of the protective case.

25. The data storage assembly according to claim 22, further comprising:
    means cooperatively attached to the protective case for storing additional data, said means for storing additional data and said additional data being independent of the separately stored data and the means for storing said separately stored data.

26. The data storage assembly according to claim 25, wherein the means for displaying data is capable of displaying data from one of the means for storing the separately stored data, the means for storing additional data, and a combination thereof.

27. The data storage assembly according to claim 4, further comprising:
    means cooperatively attached to the protective case for storing additional data, said means for storing additional data and said additional data being independent of the separately stored data and the means for storing said separately stored data.

28. The data storage assembly according to claim 27, further comprising:
    means cooperatively attached to the protective case for communicating the additional data between the protective case and at least one remote device.

29. The data storage assembly according to claim 4, further comprising:
    means cooperatively attached to the protective case for communicating the stored data between the protective case and at least one remote device.

30. A data storage assembly, comprising:
    a protective case suitable for encasing storage media, said protective case being adapted for the placement and retrieval of the storage media, the storage media being one selected from the list of a CD, CD-ROM, CD-R, CD-RW, DVD, eight-millimeter movie film, video cassette tape, video game cartridge and combinations thereof;
    a power supply;
    means cooperatively attached to the protective case and for storing data, said means being independent and separate and apart from the storage media encasable in the protective case;
    the separately stored data being one of a reproduced data, a recorded data, and a combination thereof regarding the storage media and said separately stored data being independent and separate and apart from data stored on the storage media;
    the separately stored data being storable in one of a single block and in distinct addressable segments, wherein the means for storing data comprises one of a DRPM, a CPU and a combination thereof, in electronic communication with one of a condenser microphone, a piezoelectric device and a combination thereof;
    means cooperatively attached to the protective case for playback of the separately stored data, said means for playback comprising one of a DRPM, CPU and a combination thereof, in electronic communication with one of a speaker, a piezoelectric devices and a combination thereof;
    means cooperatively attached to the protective case for activating the means for playback of the separately stored data, said means for activating the means for playback comprising one of a contact switch, a bubble switch, and a capacitance switch;
    means cooperatively attached to the protective case for activating the means for storing the separately stored data, said means for activating the means for storing the separately stored data comprising one of a contact switch, a bubble switch, and a capacitance switch;
    means cooperatively attached to the protective case for indicating an operation of the means for activating the means for playback, said means for indicating the operation of the means for activating the means for playback comprising one of a LED display, a LCD display, an incandescent bulb and any combination thereof;

means cooperatively attached to the protective case for indicating an operation of the means for activating the means for storing data, said means for indicating the operation of the means for activating the means for storing data comprising one of a LED display, a LCD display, an incandescent bulb and any combination thereof;

means cooperatively attached to the protective case for communicating the separately stored data between the protective case and at least one remote device, said means for communicating the separately stored data comprising one of an earphone jack, a stereo jack, a fiberoptic interface port, an infrared transmitter, a detector and any combination thereof;

means cooperatively attached to the protective case for displaying the separately stored data in the means for storing data, said means for displaying the separately stored data comprising one of a LED display, a LCD display, an incandescent bulb and any combination thereof;

means cooperatively attached to the protective case for storing additional data, said means for storing additional data and said additional data being independent of the separately stored data and the means for storing said separately stored data, said means for storing additional data comprising of one of a DRPM, a CPU, a RAM, a ROM, a PROM, an EPROM, an EEPROM and any combination thereof; and means cooperatively attached to the protective case for communicating the additional data between the protective case and at least one remote device separate from the means for communicating the separately stored data between the protective case and the at least one remote device, said means for communicating the additional data comprising one of an earphone jack, a stereo jack, a fiberoptic interface port, an infrared transmitter, a detector and any combination thereof.

31. The data storage assembly according to claim 30, wherein the means for displaying the separately stored data is capable of displaying data from one of the means for storing the separately stored data, the means for storing additional data, and a combination thereof.

* * * * *

UNITED STATES PATENT AND TRADEMARK OFFICE
CERTIFICATE OF CORRECTION

PATENT NO. : 6,338,405 B1  Page 1 of 1
DATED : January 15, 2002
INVENTOR(S) : Robert Yoerg et al.

It is certified that error appears in the above-identified patent and that said Letters Patent is hereby corrected as shown below:

<u>Column 3,</u>
Line 12, replace "Video Came Cartridge" with -- Video Game Cartridge --.
Line 25, replace "("EEPROM")" with -- ("EPROM") --.

<u>Column 4,</u>
Line 63, replace "second moans" with -- second means --.

Signed and Sealed this

Twenty-eighth Day of May, 2002

*Attest:*

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO. : 6,338,405 B1
DATED : January 15, 2002
INVENTOR(S) : Robert Yoerg et al.

It is certified that error appears in the above-identified patent and that said Letters Patent is hereby corrected as shown below:

<u>Title page,</u>
Item [75], Inventors, replace "Marquesste St." with -- Marquette St. --.

<u>Column 4,</u>
Line 55, replace "know" with -- known --.
Line 64, replace "moans" with -- means --.

<u>Column 5,</u>
Lines 42 and 52, replace "Liquid Crystal Diode" with -- Liquid Crystal Display --.

<u>Column 7,</u>
Line 4, replace "in earphone jack" with -- an earphone jack --.

Signed and Sealed this

Eighteenth Day of November, 2003

JAMES E. ROGAN
*Director of the United States Patent and Trademark Office*